United States Patent Office 2,904,393
Patented Sept. 15, 1959

2,904,393

PURIFICATION OF $CO_2$ AND $NH_3$

Jean Leon Maurice Frejacques, Paris, France, assignor to Pechiney, Compagnie de Produits Chimiques et Electrometallurgiques, Paris, France, a corporation of France No Drawing. Application December 11, 1956
Serial No. 627,553

Claims priority, application France January 21, 1953

9 Claims. (Cl. 23—2)

The present application is a continuation-in-part of my application Serial No. 398,197, filed December 14, 1953, now abandoned. The present invention, which results from investigations carried out by applicant, relates to the purification of $CO_2$ and $NH_3$ gases distilled from an aqueous solution thereof and contaminated with oxygen. The present invention finds particular application in the manufacture of urea by synthesis starting from ammonia and carbon dioxide, when at least a part of these reactants are derived by distillation from their solutions. However, the invention is not restricted to this particular application and can be employed wherever it is desirable to purify $CO_2$ and $NH_3$ gases contaminated with oxygen.

It is known that, in order to reduce the corrosive effect of the reactant medium in the synthesis of urea, there is preferably used carbon dioxide which is free of oxygen. Thus, in industrial installations there are used towers filled with catalysts over which passes—in gaseous phase—technical $CO_2$ containing oxygen and hydrogen; when the temperature is raised sufficiently, the catalyst brings about the combustion of the hydrogen, thus eliminating the harmful oxygen from the treated gas. However, this known method does not give satisfactory results unless it is carried out under pressure.

Moreover, the method can only be applied with difficulty to mixtures of $CO_2$ with $NH_3$, because such mixtures cannot be easily compressed to a pressure sufficient for the complete elimination of the oxygen.

These drawbacks do not exist in the case of the method of the present invention, wherein the deoxygenation is carried out in a liquid medium and not in gaseous phase.

The invention consists in eliminating the oxygen from the solutions of $CO_2$ and/or $NH_3$, from which these compounds are liberated for subsequent use in the synthesis of urea. Indeed, it has been established that when using $CO_2$ and $NH_3$ derived, for example, by distillation from an aqueous solution of ammonium carbonate, the slight amount of oxygen from the air dissolved and, eventually, dispersed in said solution, can exert considerable influence on the corrosion of the autoclave used in carrying out the synthesis. By eliminating this oxygen from the solution itself, there is obtained, by distillation, gases which are free thereof and it is then found that the corrosion is considerably reduced and even generally suppressed.

Accordingly, the process according to the invention comprehends a reducing treatment of the $CO_2$ and/or $NH_3$ solutions before or during distillation of these substances for the purpose of their introduction into the apparatus used for the synthesis.

The process can be applied to all or a portion only of one or both reactants. For example, in a manufacturing operation using carbonic acid gas derived from flue gases purified by absorption in a solution of an alkali carbonate or of ethanolamine, the solution is deoxygenated by contact with a suitable reducing agent.

Similarly, it is possible to deoxygenate the aqueous $CO_2$ solution obtained from water gas by solution under pressure.

When fresh carbonic acid gas supplied to the urea manufacturing reaction is deoxygenated in gaseous phase by a known method, the process of the present invention can still be used very usefully, if it be desired to recycle the residual $CO_2$ and $NH_3$, liberated at various points of the system, after they leave the autoclave used in the synthesis.

As is known, the transformation of $CO_2$ and $NH_3$ into urea is never complete; the reaction mass leaving the autoclave has its pressure reduced in order to volatilize that portion of these compounds which was not converted into urea.

There exists several methods for recycling this portion. One of these consists in forming an aqueous solution of the mixture of $CO_2$ and $NH_3$, and to distill the same in order to separate the $CO_2$ from the $NH_3$; (for this purpose) there are used solutions of compounds such as, for example, $NH_4NO_3$ which facilitate such separation. It is beneficial to use the process of the present invention in order to remove the free oxygen which may be present in the said solutions.

Another recycling method consists of dehydrating the $CO_2$ and $NH_3$ by distilling them—without separating one from the other—and in introducing them together into an inert oil in which they form an ammonium carbamate suspension, which is then pumped into the autoclave. This method is applicable both to the entire mass of $CO_2$ and $NH_3$ which has not been converted into urea, and distilled off directly from the liquid leaving the autoclave, as well as to the smaller fractions recovered from the already separated urea solutions from the vents of the various apparatus, etc.

Recovery of the said fractions of $CO_2$ and $NH_3$ involves preliminary formation of aqueous solutions thereof and here, also, it is very advantagouse to use the process of the invention by treating these solutions with a reducing agent in order to deoxygenate the same.

It will be understood that this reduction in a liquid medium can be carried out before distillation of the treated solution, or simultaneously therewith.

The reduction of the free oxygen present is carried out either by the addition to the solution of a suitable reagent such as, for example, pyrogallol, hydrazine or a salt of hydrazine, hydroxylamine or a salt of hydroxylamine, a hydrosulfite of an alkali metal, a ferrous, cuprous, titanous salt or a hydrate of iron, manganese, copper, titanium, etc., or by passing the solution over a metal—preferably activated—such as copper, iron, zinc, etc., possessing a sufficiently large contact surface.

The use of columns filled with metallic turnings or shot has the advantage of doing away with the metering of the reducing reagent, the amount of metal present being always in large excess in proportion to the amount of oxygen to be eliminated.

It is preferable to use reducing agents which do not leave behind an insoluble residue; in this way the necessity for filtering the treated solution is avoided. The hydrosulfites of alkali metals, and hydrazine are very suitable for this purpose. Hydrazine or a salt of hydrazine as, for example, the sulfate, has the additional advantage of being capable of use in the form of a crude solution resulting from the action of hypochlorites on ammonia—which leads to the formation of hydrazine—without the necessity of preliminarily separating the latter compound in a pure state.

On the other hand, it may be advantageous in the case of solutions of ammonium carbonate, to use metals the oxides of which are soluble in the presence of ammonia. Copper, for example, satisfies very well this condition.

In the particular case where copper is used to deoxygenate the solution, it is important that the solution of carbamate or of ammonium carbonate contains an amount of $NH_3$ at least slightly in excess of that called for by the formula $(NH_4)_2CO_3$. If this precaution is not observed, then, the deoxygenation is much less effective; it is decidedly unsatisfactory if there be present an excess of $CO_2$.

The process of the invention can most often be carried out at ordinary temperatures, or at a temperature ranging between ordinary temperatures and that at which degassing of the treated solution takes place.

The following examples, given by way of illustration and not by way of limitation, explain the invention further:

*Example 1*

Urea is produced with carbonic acid gas removed from flue gas by the known method involving absorption in a potassium carbonate solution. In accordance with the present invention, this known method is modified in that there is added to the resultant potassium bicarbonate solution 10 grammes of sodium hydrosulfite per litre before the solution is decomposed to liberate the $CO_2$ required for urea production.

*Example 2*

Urea is produced with carbonic acid gas derived from the conversion of water gas followed by absorption in water at a pressure of 20 atmospheres. Before liberating the $CO_2$, there is added to each litre of solution, 5 grammes of ferrous sulfate preliminarily dissolved in a little water and 5 grammes of 30% caustic lye.

*Example 3*

In the production of urea, fresh carbonic acid gas is preliminarily deoxygenated according to a known method by passing it in gaseous phase over a hot catalyst. The residual $CO_2$ and $NH_3$ are separately recycled. To this end, they are first absorbed in water, and the resultant solution is then passed into a column filled with iron turnings with which it remains in contact for three hours, and which results in its deoxygenation. It is then passed over a filter and, from there, into the distilling apparatus where the $CO_2$ is separated from the $NH_3$; thereupon, these two gases are recycled.

*Example 4*

In urea manufacture wherein fresh carbonic acid gas is preliminarily deoxygenated by the known method—as in Example 3—the $CO_2$ and $NH_3$ not converted into urea are recycled together, without preliminary separation from each other, in the form of a mineral oil suspension of ammonium carbamate. To this end, the urea-water-ammonium carbamate reaction mixture leaving the autoclave, has its pressure reduced in a column so as to liberate the major portion of $CO_2$ and $NH_3$, which are directly introduced in a gaseous state into an apparatus where they recombine in the presence of oil to yield a solid carbamate suspension. From the bottom of the said column, there flows out the urea-water mixture produced in the autoclave; this mixture still contains a portion of $CO_2$ and $NH_3$ which are driven off in another apparatus. This portion, together with the carbonic acid gas and ammonia coming off at vents at different points of the installation, amounting altogether to 10–15% of the fresh $CO_2$ and $NH_3$ used in the manufacture, are absorbed in water with a view to their recovery. The resultant solution containing 22% $CO_3(NH_4)_2$ and 0.4% $NH_4OH$ by weight, is introduced into a column filled with copper shot and of such dimensions that the solution passing therethrough remains in contact with the copper for two hours. The rate of flow of the solution is about 125 litres per hour per square metre of active copper surface. By subsequent distillation, this solution yields a gaseous mixture of $CO_2$ and $NH_3$—perfectly free of oxygen—which is recycled following its condensation into the form of a carbamate suspended in mineral oil.

*Example 5*

Carbonic acid gas and ammonia derived from their respective impure solutions, are absorbed in water, forming a solution containing 22% $(NH_4)_2CO_3$. Hydrazine is added to this solution in the proportion of 0.1 gramme per litre. The $CO_2$ and $NH_3$ are then distilled off, and the resultant gas mixture is completely free of oxygen.

*Example 6*

In an operation similar to that of Example 5, the aqueous solution of $(NH_4)_2CO_3$ is mixed at the rate of 15 cc. per litre with a solution obtained in the following manner: 1000 cc. of 20% aqueous solution of $NH_4OH$ are mixed with 24 cc. of a 1% gum arabic solution and 500 cc. of aqueous sodium hypochlorite containing 80 grammes of $NaClO$ per litre. As in the case of Example 5, the gas mixture distilled off the treated solution is completely free of oxygen.

*Example 7*

A series of 8 experiments has been carried out with the same solution of $(NH_4)_2CO_3$ as in Example 5, and in the same conditions, except that hydrazine has been replaced, in each experiment, by another reducing agent:

|   |   | Grams per litre |
|---|---|---|
| (1) | Monoacetate of hydrazine | 0.285 |
| (2) | Sulfate of hydrazine | 0.4 |
| (3) | Monochloride of hydrazine | 0.21 |
| (4) | Sulfite of hydrazine | 0.24 |
| (5) | Hydroxylamine | 0.2 |
| (6) | Sulfite of hydroxylamine | 0.3 |
| (7) | Sodium hydrosulfite | 1.1 |
| (8) | Pyrogallol in the form of 5% aqueous solution containing 60% KOH (that is 5 cm.³ of this solution) | 0.26 |

In each of the 8 above cases the resultant gas mixture was completely free of oxygen.

In addition to the reducing agents mentioned above the following have been found adapted for the purposes of the present invention: citrates, tartrates, oxalates, formates, phosphates, phosphites of hydrazine and of hydroxylamine, as well as potassium, magnesium, calcium, ammonium hydrosulfites. In addition to pyrogallol, other polyphenols, such as for example hydroquinone, may be used, eventually together with other reducing agents. Aldehydes are also suitable; formaldehyde may be successfully used, especially in the form of its known combination with an hydrosulfite.

I claim:

1. Process for purifying $CO_2$ and $NH_3$ contaminated with free oxygen, comprising the following steps: dissolving the $CO_2$ and $NH_3$ in an aqueous medium; treating the resultant solution with a reducing substance to produce the combination of said reducing substance with the free oxygen present in the solution, and distilling the solution to recover the $CO_2$ and $NH_3$ in substantially pure condition.

2. A method according to claim 1, characterized in that said substance consists of pyrogallol.

3. A method according to claim 1, characterized in that said substance consists of a hydrosulfite of an alkali metal.

4. A method according to claim 1, characterized in that said substance is selected from the group consisting of ferrous, cuprous, titanous salts and hydrates, and of metallic copper, iron and zinc.

5. Process according to claim 4, wherein copper is used, and the ammonia content of the solution is in excess of the amount required by the formula $(NH_4)_2CO_3$.

6. Process according to claim 1, in which the treatment is carried out at a temperature ranging between ordinary temperatures and that at which degassing of the treated solution takes place.

7. Process according to claim 1, characterized in that said substance comprises a compound selected from the group consisting of hydrazine and salts of hydrazine.

8. Process according to claim 1, characterized in that said substance consists of a compound selected from the group consisting of hydroxylamine and salts of hydroxylamine.

9. The method of purifying $CO_2$ and $NH_3$, distilled from an aqueous solution thereof and contaminated with oxygen, comprising the step of adding to said solution, prior to the distillation, a hydrosulfite of an alkali metal capable of combining with free oxygen in aqueous medium.

References Cited in the file of this patent
UNITED STATES PATENTS

| | | |
|---|---|---|
| 1,954,973 | Zaniboni | Apr. 17, 1934 |
| 2,170,596 | Quiggle | Aug. 22, 1939 |
| 2,421,568 | Kurland | June 3, 1947 |
| 2,680,766 | Ropp et al. | June 8, 1954 |